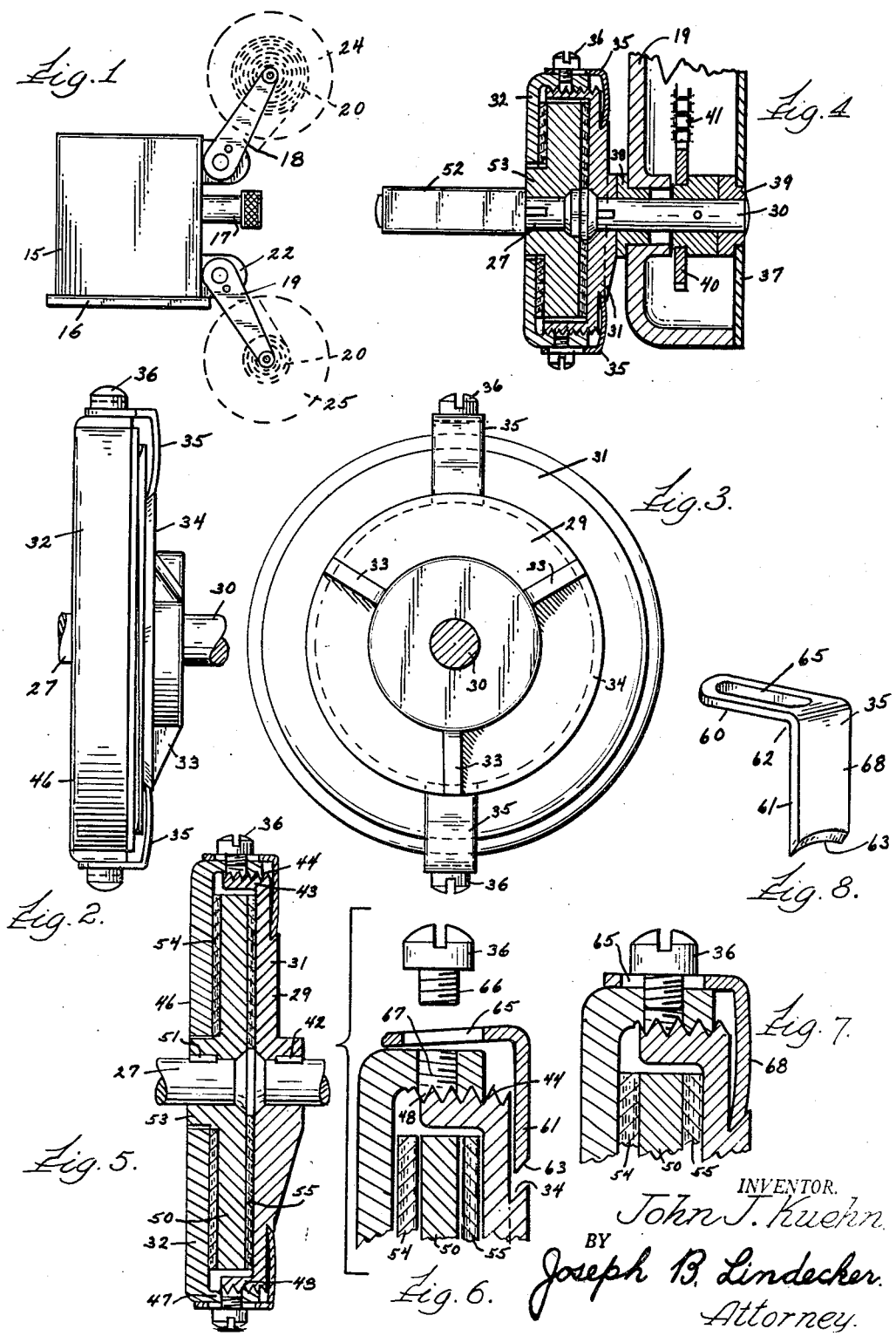

United States Patent Office 2,709,349
Patented May 31, 1955

2,709,349

LOCKING DEVICE FOR POWER DRIVE COUPLINGS

John J. Kuehn, Chicago, Ill.

Application September 25, 1953, Serial No. 382,325

8 Claims. (Cl. 64—30)

My invention relates to power-transmitting couplings and locking means for securing same in proper adjustment.

It is an object of my invention to produce a locking device for use with adjustable couplings for driving interconnecting two approximately coaxial shafts, said couplings capable of transmitting rotation in either direction between the two shafts.

A further object of my invention is to produce a locking device for use with adjustable couplings which can be simply and economically manufactured, which will provide shock-absorbing capabilities, and which, at the same time, will provide a positive locking connection between the external surfaces of the coupling.

In carrying out my invention, I employ a locking means for use with a hollow, flange type female coupling member and a hollow, flange type male coupling member, the female member having an internally threaded section adapted for engagement with the external threaded section provided upon the flange portion of said male member, whereby said members may be moved away or drawn toward each other for adjustment in combination with suitable clutch mechanism embodied within said members, the locking means comprising one or more angular fasteners having spring-like characteristics, said locking means having one end adjustably secured to the outer surface of said female member and having its opposite end in pressing and locking engagement with the outer surface of said male member.

My invention relates to locking devices for use with power drive couplings of various types and has been found to be noteworthy in use with motion picture apparatus and film driving mechanism with commercial printing devices, and the like.

The accompanying drawings illustrate my invention:

Figure 1 is a side view of a motion picture projector which is constructed in accordance with and which illustrates one embodiment of the invention, parts of the projector not being shown;

Figure 2 is a view in side elevation of a power drive clutch coupling, showing a locking device constructed and assembled therewith in accordance with and which illustrates a preferred embodiment of the invention, parts of the driving and driven shafts broken away;

Figure 3 is a rear view of the clutch coupling and locking device as shown in Figure 2;

Figure 4 is a sectional view of the clutch coupling and locking device as used with a projector take-up reel mechanism and showing the driving mechanism and friction discs;

Figure 5 is an enlarged sectional view of the clutch coupling housing with the locking device and enclosing the driving mechanism and friction discs as shown in Figure 4;

Figure 6 is a fragmentary disassembled, enlarged, sectional view of the invention shown in Figure 5;

Figure 7 is an enlarged fragmentary sectional view of parts shown in Figure 5;

Figure 8 is a perspective view of the spring steel locking device as shown in all the figures, 1 through 7 inclusive.

Referring first to Figure 1, 15 deisgnates the body of a motion picture projector machine, with base 16, lens mount 17, said body or housing having supporting brackets 21 and 22 for pivotally supporting arms 18 and 19 for mounting reels of film 20 as usually done by a machine of this type. The feeding reel is designated 24 and the take-up reel is designated 25.

Referring to Figures 2 and 3, the clutch coupling assembly embodies a driving shaft 30, a male type housing member 31, a female type housing member 32, reinforcing ribs 33, a V-section annular groove 34 arranged in the outer surface of said male member 31, two spring-steel locking members 35, two oval fillister head screws 36, and driven shaft 27.

Referring more specifically to Figures 4 through 8 inclusive, arm 19 is provided with a back plate 37 to enclose said arm with parts therein. The driving shaft 30 is supported by bearings 38 and 39 within said arm 19. Said shaft 30 has a sprocket gear 40 pinned thereon to receive the chain 41 driven by suitabe means not shown. One end of shaft 30 extends outside the arm 19 and has a male member, metal cup shaped flange 31 keyed thereto by key 42, or otherwise secured thereto as desired, said flange 31 having a vertical wall 29 and a horizontal, cylindrical flange portion 43, with external screw threads 44 on its peripheral surface. Associated with cup-shaped flange 31 is said cup-shaped female member 32 with vertical wall 46 and cylindrical rim portion 47, said rim portion 47 being provided on its interior with threads 48 for engagement with threads 44 of flange 43 to form an adjustable housing to enclose the yielding mechanism about to be described.

Enclosed between flanges 31 and 32 is a metallic disc 50 keyed to the driven shaft 27 by key 51, said shaft 27 supporting a film reel spindle 52 which is secured thereto by suitable means not shown. Said disc 50 has a hub portion 53 formed therewith to form a shoulder for use with reel 25. Positioned on each side of said disc 50 is an assembly of leather washers, or disc-like friction members, 54 and 55. These friction members are saturated with oil and held in close engagement with vertical walls 29 and 46 of housing members 31 and 32, as well as with disc 50, by adjusting the position and relation of flanges 43 and 47. The disc 50 may be composed of any suitable metal which will function with said leather washers 54 and 55; as described in my Patent No. 2,545,960.

The above described mechanism forms a yielding coupling permitting variance of speed and power of the take-up reel spindle 52 dependent upon the instant diameter of the film roll on a radially winding film strip take-up reel 25 driven by said reel spindle 52, said action being accomplished by the slippage of the leather discs 54 and 55 between the metal disc 50 and housing members 31 and 32, said housing members being locked in position by two or more spring-steel locking members 35, secured to flange 47 by fillister head screws 36. Further, said disc 50, being constructed of suitable metal and of desired weight has the characteristics of a floating flywheel which regulates the friction slip of said leather discs as well as the motion of the reel spindle and reel thereon. It is to be noted that the metal disc 50 secured to the driven shaft 27 is not supported except by the clamping action of housing members 31 and 32; in other words, members 27, 50, 52 and 53 are substantially floating. When the reel pull is increased, the force is transmitted to the weighted disc 50 which presses the friction discs 54 and 55 into tighter engagement with said vertical walls 29 and 46 of housing members 31 and 32. As for example, if the force is downward on spindle 52, this force causes the lower portion of disc 50 to press fiber disc 55 against the lower portion of wall 29; likewise, the upper portion of disc 50 presses disc 54 against the top part of wall 46. This action increases the friction and gives increased power to drive the reel 25. Therefore, as the weight of the rool increases, the friction between the discs and the housing members increases, thus providing automatic compensation of power and friction for all sizes and weights of reels.

If ideal performance of the power coupling is not attained, where the exact amount of reel driving power is not attained, then the clutch coupling requires adjustment of its housing members 31 and 32. In the past, it has been common practice, as shown by Patent No. 2,545,960, to have threaded housing members adjusted and then locked in position by use of a set-screw placed in the female flange portion thereof and forced into contact with the thread upon the male flange portion thereof. This use of a set-screw damages the threads with which it comes in contact, and the ideal adjustment desired is not attainable once the set-screw is retracted and then again tightened in place. The housing member 32 is loosened from housing member 31 if turned in a counter-clockwise direction. For proper adjustment, to obtain different torques required for various conditions, housing member 32 should be turned in a clockwise or counter-clockwise direction until proper friction is achieved between the discs and the housing members. My novel locking clamp 35 is required to safely secure the parts together without damaging the threads of the male flange portion, the flange portion itself or any of the parts adjacent and in contact therewith.

My locking and clamping device employs an angular body member 35 clearly shown by Figure 8; said angular member 35 comprising a formed member of resilient metal having a substantially horizontal side extension 60 and a substantially vertical leg extension 61 and with an angle 62 therebetween of somewhat less than 90 degrees. The lower edge portion 63 of vertical leg extension 61 is tapered and of arcuate configuration, similar in configuration to the base or bottom surface 64 of annular V-shaped groove 34 arranged in the outer surface of male member 31. The side extension 60 has an elongated opening, or slot, 65 through which the threaded portion 66 of a screw 36 will freely pass. The flange portion 47 of member 32 is provided with two or more threaded apertures 67 to receive the threaded portions 66 of screws 36. Said slot 65 is elongated so that the leg extension 61 can be moved into substantially close engagement with the side wall of housing member 31 when said side extension 60 of member 35 is drawn into tight engagement with flange 47 by means of screws 36, thereby forcing the tapered edge portion 63 into pressing and locking engagement with adjacent portions of said V-shaped annular groove 34. The threaded portion 66 of screw 36 is shorter than the depth of threaded aperture 67 so that the extremity of the threaded portion can not contact the threads 44 on the male flange 47 of housing member 31 adjacent thereto. The leg extension 61 is of greater length than the distance between the V-shaped groove 34 and the clamping surface on the exterior of said flange 47. Therefore, when the side extension 60 is locked in place on said flange 47 and the tapered portion 63 of leg extension is forced into said groove 34, the intermediate portion 68 of the leg extension 61 of resilient metal will be forced to spring slightly outwardly, as clearly shown by Figure 7.

The assembly of the locking member 35, with housing members 31 and 32, is slidable or movable relative thereto, and the present invention provides means for manually adjusting, or varying, the cooperative frictional pressure between the locking member 35 and the contact portions of V-shaped groove 34. A screw 36 with threaded portion 66 is screw-threaded into the flange portion of housing member 32 clamping locking member 35 tightly in place and exerting a compression strain on the leg extension 61 having its end portion tightly embedded in said groove 34 provided in housing member 31.

The advantages secured by the locking device according to the present invention, as compared with the locking devices hitherto known, are many, a few of which are as follows: the locking power for the same force employed is increased, which also means reduced strain on the flange portions of the male and female couplings; the resilient metal locking surface is increased and possesses capabilities of absorbing shocks between the driving and driven parts thereof; the V-shaped construction embodied in the heavier portion of the male coupling reduces the possibility of the couplings becoming oval under pressure of common set-screw type means; the large number of fine threads embodied in the flanges of the couplings are used to give fine and accurate adjustment and not employed in any manner for contacting parts of the locking device; finally, it should also be possible with this construction, to make use of smaller couplings with greater locking power and extend the life of all couplings where adjustment is frequently needed.

Although the foregoing description is necessarily of a detailed character, in order to define the structure, function, and advantages of the invention, it is to be understood that the specific terminology is not intended to be restrictive or confining and that various rearrangements of parts and alternate combinations of elements may be resorted to without departing from the scope or spirit of the invention as herein claimed.

I claim:

1. A weight controlled reel drive comprising a drive shaft, a cup-shaped male driving disc mounted on said shaft for rotation therewith, a female cup-shaped disc mounted on said male driving disc, the flange portions of each disc having complementary threads for assembly of said discs into a housing of adjustable width, a driven disc within said housing, a driven shaft mounted for rotation with said driven disc, a plurality of resilient metal means secured to said female cup-shaped disc, each of said resilient means having a bent leg extension bent at right angles to the plane of its body portion, the end of each of said leg portions providing a work engaging surface of arcuate configuration, said male driving disc having a groove on the outer vertical surface thereof, each of said work engaging end portions of said resilient metal means adapted for engagement with said groove when said metal means is secured to said female disc and thereby resisting relative rotation between said cup-shaped discs.

2. In a power drive assembly, the combination of a drive shaft, a cup-shaped male driving disc mounted on said shaft for rotation therewith, a female cup-shaped disc mounted on said male driving disc, the flange portions of each disc having complementary threads for assembly of said discs into a housing of adjustable width, a driven disc within said housing, a driven shaft mounted for rotation with said driven disc, said male cup-shaped driving member having a shoulder on the outer vertical surface, said shoulder having a working surface thereon, the female cup-shaped member having bolted thereto a resilient metal fastener, said fastener comprising a body portion of ribbon-like material having a bolt receiving opening at one end thereof, said fastener having a leg extension portion, the free end portion of said leg extension provided with a work engaging surface, said free end portion resiliently held on said working surface of said shoulder and thereby resisting relative rotation between said cup-shaped discs.

3. In a power drive assembly, the combination of a drive shaft, a male cup-shaped driving disc mounted on said shaft for rotation therewith, a female cup-shaped disc mounted on said male driving disc, the flange portions of each disc having complementary threads for assembly of said discs into a housing of adjustable width, a driven disc within said housing, a driven shaft mounted for rotation with said driven disc, said male cup-shaped driving member having an annular groove formed on the outer vertical surface thereof, said female cup-shaped member having bolted thereto a resilient metal fastener, said fastener comprising a body portion of ribbon-like material having a bolt receiving opening at one end thereof, said fastener having a leg extension portion, the free end portion of said leg extension provided with a work engaging surface, said work engaging surface on said free end portion positioned within said annular groove, said leg extension being arched between its ends when in said work engaging position in said groove, to impart resiliency and resist relative rotation between said cup-shaped discs solely by spring tension.

4. In a power coupling, the combination of a hollow cup-shaped female member, a hollow cup-shaped male member, the flange portions of each member having complementary threads for assembly of said members into a housing of adjustable width, said female member having a resilient metal fastener bolted to the outer surface of its flange portion, said fastener having a leg extension with a work engaging end portion, said male member having a substantially V-shaped annular groove on its outer surface of its vertical wall portion, said work engaging end portion of said leg extension being deformed to tightly fit into said V-shaped groove when said fastener is bolted to said female member and thereby resisting relative rotation between said cup-shaped members.

5. In a locking device, the combination of a hollow cup-shaped female member, a hollow cup-shaped male member, the flange portions of each member having complementary threads for assembly and adjustment of said members into a housing of adjustable width, said female member having a spring metal fastener bolted to the outer surface of its flange portion, said fastener comprising a body portion in a substantially flat plane having a bolt receiving opening extending therethrough, a bent leg portion extending beyond said body portion and bent at right angles to the plane of said body portion, the end of said leg portion providing a work engaging surface of arcuate configuration, said cup-shaped male member having a substantially V-shaped annular groove on its outer surface of its vertical wall portion, said work engaging end portion of said fastener adapted for engagement with said V-shaped groove when said fastener is bolted to said female member and thereby resisting relative rotation between said cup-shaped members.

6. An adjustable coupling of the character described, comprising a cup-shaped female member, a cup-shaped male member, the flange portion of each member having complementary threads for assembly of said members into a housing of adjustable width, an annular shoulder on the vertical surface of said male member, said shoulder having a work engaging surface, and a plurality of resilient metal type locking members each having one end thereof secured to the exterior surface of said female member with the opposite ends of said locking members in pressing contact with said work engaging surface of said annular shoulder on said male member.

7. An adjustable coupling of the character described, comprising a cup-shaped female member, a cup-shaped male member, the flange portions of each member having complementary threads for assembly of said members into a housing of adjustable width, an annular groove in the exterior surface of said male member, and a plurality of adjustable resilient metal type locking members each having one end thereof secured to the exterior surface of said female member with the opposite ends of said locking members in pressing contact with the inner grooved surface of said annular groove on said male member.

8. An adjustable coupling of the character described, comprising a cup-shaped female member, a cup-shaped male member, the flange portions of each member having complementary threads for assembly of said members into a housing of adjustable width, an annular V-shaped groove in the exterior surface of said male member, a plurality of adjustable resilient metal type locking members of angular configuration having the horizontal side portions thereof secured to the top exterior surface of the flange portion of said female member, said annular V-shaped groove formed in the vertical side wall portion of said male member, and the leg portions of said locking members having work engaging end portions arranged in pressing contact with said V-shaped groove of said male member.

References Cited in the file of this patent

UNITED STATES PATENTS 2,545,960    Kuehn _____ Mar. 20, 1951

FOREIGN PATENTS 214,959    Great Britain _____ 1924